United States Patent [19]
Snyder

[11] Patent Number: 4,834,265
[45] Date of Patent: May 30, 1989

[54] AUTOMATIC WATERING DEVICE FOR DECORATIVE PLANTS

[76] Inventor: Stuart D. Snyder, 2948 S.W. 22nd, Circle #5-C, Delray Beach, Fla. 33445

[21] Appl. No.: 62,326

[22] Filed: Jun. 9, 1987

Related U.S. Application Data

[63] Continuation of Ser. No. 581,541, Feb. 21, 1984, abandoned, which is a continuation of Ser. No. 285,834, Jul. 22, 1981, abandoned.

[51] Int. Cl.⁴ .............................................. A01K 5/02
[52] U.S. Cl. ...................................... 222/1; 222/644; 222/650; 239/66; 239/70
[58] Field of Search ......... 222/1, 61, 64, 66, 638–639, 222/644, 650, 372, 476, 478, 481–483; 239/67, 69, 70–72, 582.1, 66; 137/624.11, 624.12, 624.2, 565, 870, 624.13, 624.15, 624.21, 624.27; 248/75; 340/539

[56] References Cited

U.S. PATENT DOCUMENTS

| | | | |
|---|---|---|---|
| 357,056 | 2/1887 | Weil | 137/624.27 |
| 933,464 | 9/1909 | Kasjens | 239/582.1 |
| 3,319,913 | 5/1967 | Schoepe et al. | 248/75 |
| 3,437,241 | 4/1969 | Pei | 222/650 |
| 3,438,383 | 4/1969 | Gorlin | 222/184 X |
| 3,524,471 | 8/1970 | Bresser | 137/624.12 |
| 3,747,166 | 7/1973 | Eross | 248/75 |
| 3,847,173 | 11/1974 | Hill | 137/870 X |
| 3,940,063 | 2/1976 | Baumgartner et al. | 239/70 |
| 3,991,939 | 11/1976 | Maclay | 239/63 |
| 4,012,673 | 3/1977 | Saarem et al. | 361/196 |
| 4,062,491 | 12/1977 | von Skwarski | 239/66 |
| 4,107,546 | 10/1976 | Sturman et al. | 307/141 |
| 4,114,647 | 9/1978 | Grill et al. | 137/624.2 |
| 4,191,184 | 3/1980 | Carlisle | 222/61 X |
| 4,196,748 | 4/1980 | Gillespie | 137/565 |
| 4,333,490 | 6/1982 | Enter, Sr. | 137/78.3 |
| 4,369,438 | 1/1983 | Wilhelmi | 340/539 X |
| 4,496,077 | 1/1985 | Zuehlsdorf | 222/61 |

Primary Examiner—Michael S. Huppert
Attorney, Agent, or Firm—Clifford L. Tager

[57] ABSTRACT

An automatic watering system for decorative plants which has adjustable timing capabilities for providing periodic, unattended watering of plants. It further includes tubing with branching capability so that complex distribution systems that are unobtrusive and concealable may be constructed. It may have check valves and T-sections with built-in valves to prevent flooding. It has a unique monitoring system that indicates an alarm indication in case of flooding or failure to provide water. The system may be constructed as a low pressure system for small installations or a high pressure system drawing water directly from the water mains.

12 Claims, 3 Drawing Sheets

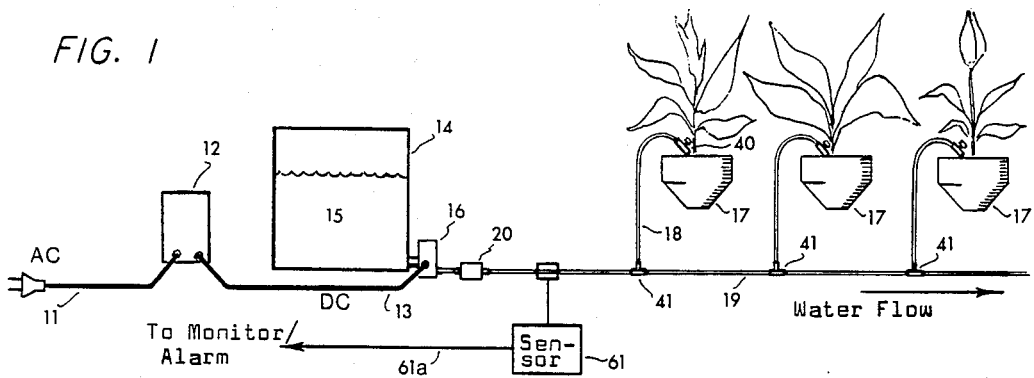
FIG. 1
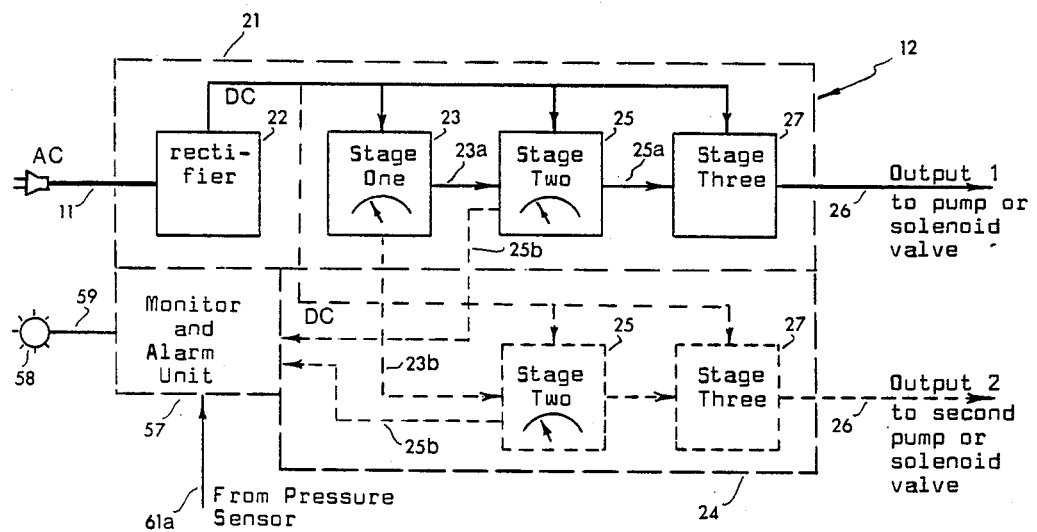
FIG. 2
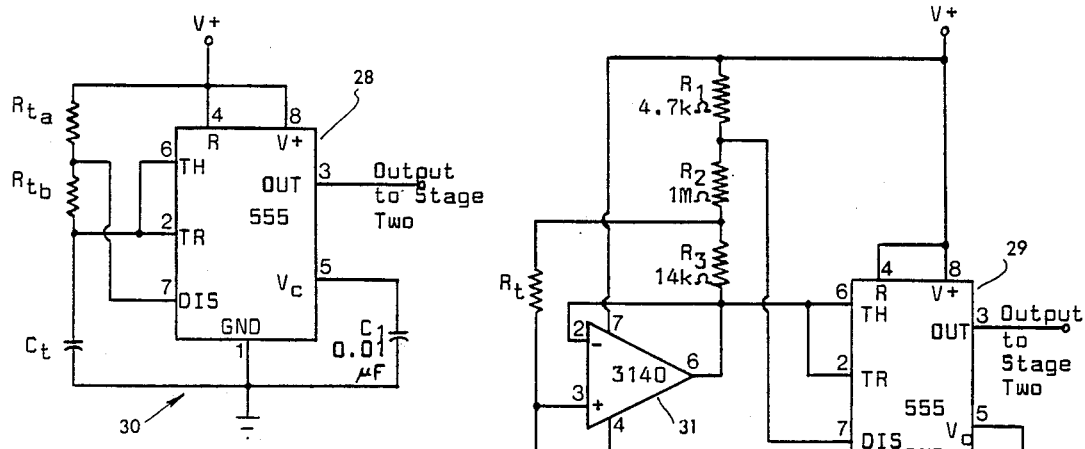
FIG. 3
FIG. 4

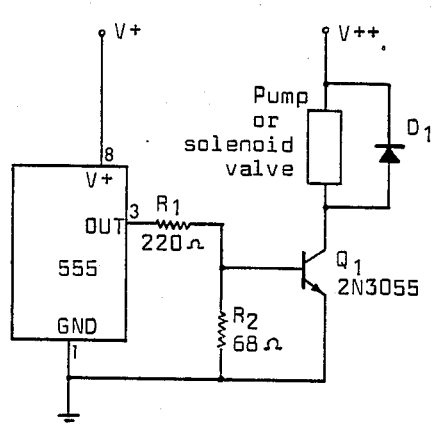
FIG. 5
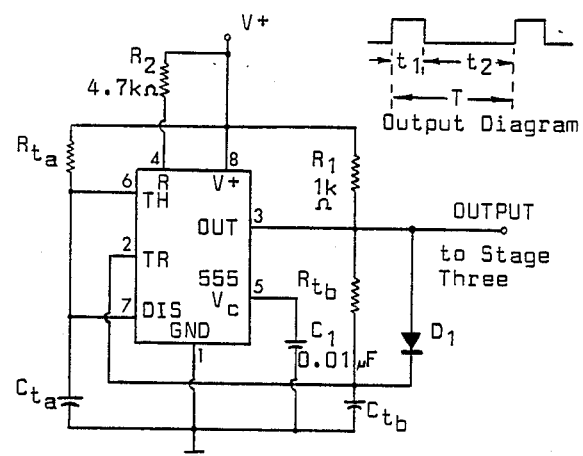
FIG. 6a
FIG. 6
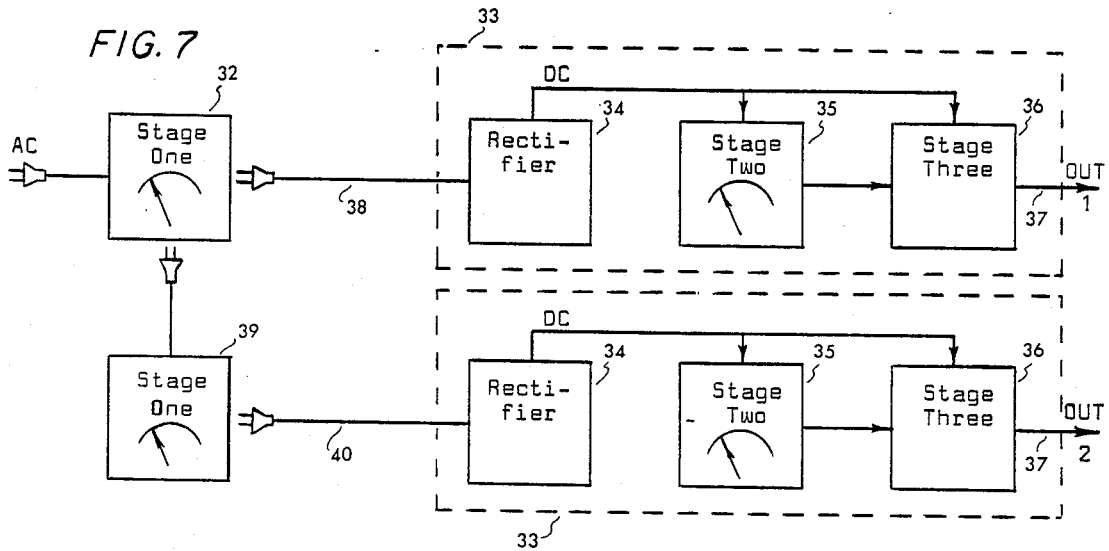
FIG. 7
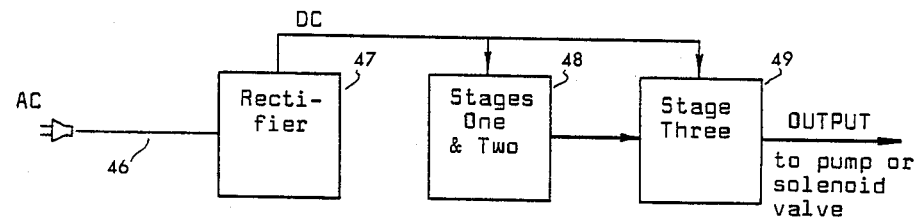
FIG. 8

AUTOMATIC WATERING DEVICE FOR DECORATIVE PLANTS

RELATED APPLICATION

This application is a continuation application of Ser. No. 06/581,541 filed Feb. 21, 1984, now abandoned, which is a continuation-in-part application of Ser. No. 06/285,834 filed July 22, 1981, now abandoned.

BACKGROUND AND PRIOR ART

The invention relates to automatic watering systems for plants and more particularly to systems for automatic watering of decorative indoor plants wherever accidental overwatering or failure to water may cause damage to the interior decor or loss of expensive plants, and wherein unsightly control apparatus and distribution is undesirable.

The field of the prior art includes watering systems for plants that include timed distribution of the water.

U.S. Pat. No. 4,333,490 issued June 8, 1982 discloses a watering system with timed water distribution that includes light and humidity sensors for further control.

U.S. Pat. No. 4,114,647 issued Sept. 1978, employs latching solenoids and a master control unit.

U.S. Pat. No. 4,012,673 issued Mar. 1977 discloses a watering system employing timed solid state control also with latching solenoids.

U.S. Pat. No. 4,107,546 issued Aug. 1978 discloses a watering system employing valve control with a master control unit and battery controlled electronics.

U.S. Pat. No. 3,991,939 issued Nov. 1976 discloses an automatic watering system for spraying and cooling vegetation which comprises a special evaporatory moisture sensor.

OBJECTS OF THE INVENTION

The present invention comprises automatic timers for timing the duration of the watering periods and the time intervals therebetween combined with a unique water distribution system of readily concealable tubing and fittings that can be placed unobtrusively in places where neatness and decor are important, and where overwatering could cause serious water damage and where total lack of watering could lead to complete loss of expensive decorative plans.

In another embodiment, lower water pressure distribution provides a safer method of distribution with reduced danger of water damage due to leaks in the system or separation of the tubing.

It is another object of the invention to provide an automatic watering system that can be arranged modularly in stages that can be combined in different combinations in order to accommodate varying decorative plant arrangements.

It is another object of the invention to provide the flow rate required by plants growing in a reduced light environment such as indoors or in deep shade locations.

One embodiment of the invention is intended for larger installations requiring higher water pressure for proper distribution while another embodiment for smaller installations may use low pressure water supply.

It is still another object to provide a watering system that distributes water in short periods of watering with resulting short periods of pressurization which in turn creates operation with reduced danger of water damage and allows more accurate control of the water volume to be distributed.

Other objects of this invention will appear from the following description and appended claims, references being had to the accompanying drawings forming a part of this specification wherein like reference characters designate corresponding parts in the several views.

BRIEF DESCRIPTION OF THE DRAWINGS

FIG. 1 is a diagrammatic representation of the invention showing the low pressure watering embodiment.

FIG. 2 is a block diagram of the invention showing its major building blocks.

FIG. 3 is a schematic circuit diagram of a typical timing circuit based on electronic technology.

FIG. 4 is a schematic circuit diagram of another electronic timing circuit suitable for longer time durations.

FIG. 5 is a schematic circuit diagram of a timing circuit connected with a pump or solenoid valve.

FIG. 6 is a schematic circuit diagram of a timing circuit which includes a timing diagram, (FIG. 6a).

FIG. 7 is a block diagram of the invention showing its modular construction.

FIG. 8 is a block diagram of the invention in a small embodiment.

DETAILED DESCRIPTION

Figure 9:
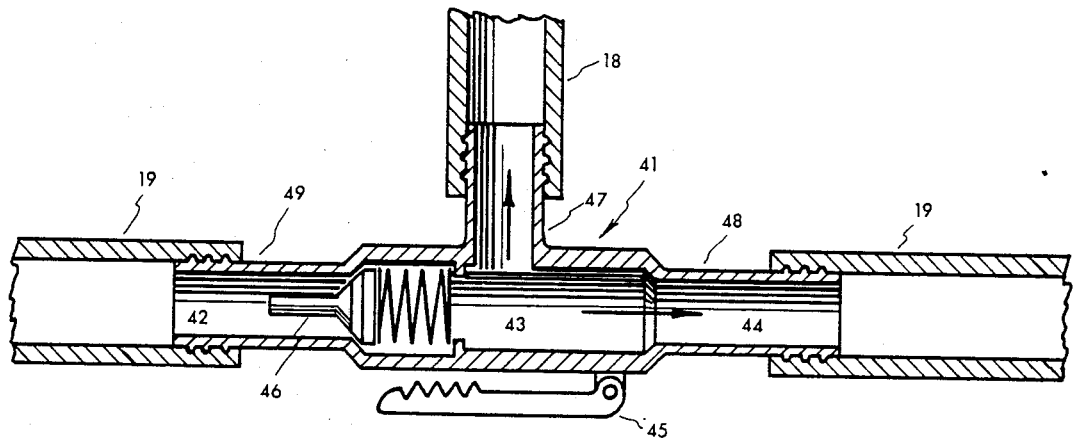
FIG. 9 is a vertical cross-sectional view of a T-section with check valve.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

FIG. 1 shows in diagrammatic form an embodiment of the invention comprising the major elements. The system receives its primary power from an AC-power connection 11 connected to a timing and control unit 12 which in turn provides power for a water pump 16. The water pump draws water 15 from a water source 14, which, in the embodiment of FIG. 1 may simply be a water receptacle, such as a suitable tank of sufficient storage capacity, or a tank with unlimited access to a water main such as a toilet tank, or an electric solenoid water valve connected to the water mains.

It should be noted that AC-operation is entirely a choice of design. The system may as well be operated by means of a DC-power source, such as storage batteries by suitable adaptation of the components of the system.

The water pump 16 draws water from the water source 14 and delivers it to a water distribution system consisting of tubing of relatively small diameter 19 consisting of preferably flexible transparent tubing of polyethylene or polyvinyl chloride or any other similar suitable plastic tubing that may be installed unobtrusively in a setting such as an office or residence with decorative plants 17 that need regular watering.

A check valve 20 is inserted in the tube connection behind the pump so that water pumped into the distribution system cannot run backward through the pump and back into the water reservoir. The check valve 20 makes it possible to distribute water to plants at elevations that are higher than the surface of the water 15 in the water receptacle 14. Certain types of pumps, when at rest, such as vane pumps and piston pumps do not allow water to flow through them when they are not rotating and therefore may not need a check valve.

Depending on the extent of the watering installation, the distribution system 19 may include branch tubes 18 connected to the water tube 19 through suitable T-sections 41. The T-sections may preferably be made of transparent plastic and may include clips or hooks so that they can be attached unobtrusively behind foliage, curtains and the like. Another preferred embodiment of the T-section may include a small check valve such as a ball or a poppet in a valve seat. Such T-sections will prevent water from an extensive distribution system from flowing backwards through a break in the system and cause water damage to furniture, carpets and the like.

The branch sections 18 lead water to the individual plants located in containers 17 distributed throughout the area to be watered.

As part of the automatic watering system each branch tube 18 may terminate in a nib 40 which may be a small valve with an adjustable water constriction with a screw head for adjusting the flow of water to the particular plant.

The timing and control unit 12 contains all the apparatus required for operating the pump 16 on a timed basis.

The major building blocks of the timing and control unit 12 are shown in FIG. 2 wherein an AC-connection 11 provides primary power from the AC-mains to a rectifier unit 22 which is part of the basic system module 21.

The basic system module 21 shown in dashed lines further contains a stage one timing module 23, and a stage two timing module 25 and a stage three module 27 which is a power control module with an output 26 connected to pumps or power-operated water valves, such as solenoid valves or the like.

The timing units 23 and 25 are timing components that in turn control the stage three power control unit 27 to turn it on during watering periods, when water is dispensed, separated by timing intervals when no water is being dispensed from the system.

An add-on system module 24 is a simpler and smaller system module that serves to expand the system size for dispensing water to a larger number of plants than can be accommodated by the basic system module 21. The add-on system module 24 shares the rectifier unit 22 and the stage one timing module 23 with the basic system module 21 and may be attached thereto by means of a multi-wire connecting core or a multi-pin plug connector so that the add-on system module may be added to the basic system module by the simple means of plugging the two together.

The basic system module 21 and the add-on module 24, each connect to a pump when used in a low pressure embodiment, drawing water from a water receptacle 14 or a solenoid valve (not shown) water source when used in a high pressure system drawing water from the water mains. It follows that the system may be configured such that one system module, e.g. the basic system module 21, may draw water from a water receptacle 14, and the add-on module may draw water from the water mains or vice versa, if so merited.

The rectifier unit 22 contains components that are conventional, such as transformers for reducing the main AC-voltage to a lower voltage level, such as 12 volts, that is suitable for distribution to small pumps and solenoid valves, and for operating the timing units 23, 25 and the power control unit 27. The DC voltage is distributed to the timing and power control units as shown in FIG. 2, to the basic module 21 and to the add-on module 24, or to several add-on modules if such usage is anticipated.

The stage one and stage two timing modules 23 and 25 contain timers set for the timing functions required by the stage three power and control unit 27 which dispenses water as required by the particular installation.

As is well known, there are many types of timing units available for such purposes, such as timers driven by small synchronous motors and appropriate reduction gearing, driving switching contacts, or timing units based on time delayed relays, or timing units based on electronic technology. Here again, there are electronic timers of digital construction as are well known from the now widely used electronic digital watches that are primarily driven by a very accurate crystal-controlled oscillator connected to electronic divider circuits employing chains of so-called flip-flops that reduce the high crystal frequency to slower time functions based on minutes or hours. Other electronic timing circuits are based on the use of time constants of resistors and capacitors. Such timing circuits are now widely used in the form of small integrated circuit chips, such as the widely used time circuit LM555 from National Semiconductor Corp. or similar circuits from several other manufacturers.

The digital timing circuits are also available as so-called clock chips that are driven from the AC-frequency of 60 Hz from the AC-mains and are widely used in small alarm clocks.

Generally stated, the digital type timing circuits lend themselves best for longer timing period, such as hours or days, while the analog type circuits lend themselves best and are very economical for shorter timing periods such as minutes and seconds. Integrated circuits of the clock-chip type are also manufactured by several manufacturers such as National Semiconductor Corp. that produces the MM5456 alarm clock chip timer, and the MM5865 universal timer and the COP402 micro-controller.

In a practical realization of the invention, a type Signetics NE555 timing chip has been used for the stage two timing unit 25 and the XR-2242 timer/counter followed by an XR-2240 timer/counter has been used for the stage one timing unit 23.

The XR-2242 and the XR-2240 chips from EXAR represent an extension of the timing technology which combines a 555 type timer with a digital counter section which may optionally be programmable as in the XR-2240.

A typical circuit diagram based on the NE555 type integrated timer is shown in FIG. 3, which shows a 555 chip 28 as the central element, with timing controlled by the two resistors Rta and Rtb and the capacitor Ct. The circuit is driven by a positive voltage V+ in the so-called astable mode in which it repeatedly retriggers itself to repetitively produce identical timing periods.

A somewhat improved circuit of the same type is shown in FIG. 4, which further comprises a so-called linear amplifier 3140 (31). The circuit of FIG. 4 is capable of producing longer time intervals of reasonable stability for the present purpose. Another timing circuit, also based on the type 555 chip is shown in FIG. 6 which further consists of a single 555 chip but includes a diode Di that allows the circuit to produce two independently controllable time periods t1 and t2, shown in FIG. 6a, that are independently controllable by means of two different sets of timing components, consisting of Rta and Cta that control the period t1, during which the timer output is positive and components Rtb and Ctb that control the period t2, during which time the output is nearly zero.

All the different types of timers described above are constructed so that the timing periods can be varied by different timing control means, which are different for the different types of timers. The timing means are generally indicated on the drawings as an arrow inside an arc, which simply indicates that the timing can be adjusted within a suitable range of timing.

The present invention, however, is not directed to the method of timing per se and the methods employed for adjusting the timing period. This information is readily available from manufacturers of timers who also supply all other applications information that may be needed for the proper use of the timers. Rather, the invention is directed to an automatic watering system and its control.

In practical realization of the invention, a type XR-2242 timer/counter followed by an XR-2240 timer/counter were used successfully in a cascaded arrangement for stage one 23 as shown diagrammatically in FIG. 2. These were followed by a type 555 timer operating in its monostable mode, as stage two 25 in FIG. 2.

In operation, stage one 23, when turned on, is set to continuously produce interval timing pulses that each indicate the start of a watering period. The interval timing pulse could, for example, be set to reoccur typically every 24 hours. Each interval timing pulse in turn triggers stage two 25 to produce a watering period, which could, typically, for example, last 10 seconds. At the beginning of the watering period, the stage two 25 timer produces at its output 25a a high potential of typically 5 volts that stays high for the duration of the watering period. As stated above, both timing stages one and two, 23 and 25 respectively, can be manually adjustable to produce timing within a suitable range. It follows that the watering period produced by the stage two timer 25 will be of shorter duration than the timer interval between two interval timing pulses. Otherwise the pump 16 would be running continuously.

Stage two 25, when its output 25a goes high, operates a power control device in stage three which has sufficient power capacity to turn on the solenoid of a solenoid valve or to turn on a pump motor. Solenoid valves and small water pumps are conventional and are available from many commercial sources. The stage three power control has an output 26 which is connected to the solenoid valve or pump motor which in turn activates the flow of water.

FIG. 5 shows a power control stage consisting of power transistor Q1, driven by a 555-type device operating as a stage two 25 timer.

The add-on system module 24 has only a stage two watering period timer 25 and a stage three power control device 27, but receives its interval timing from an output 23b of the basic system module 21, stage one 23, interval timer.

FIG. 2 also includes a monitor and alarm unit 57, that operates to monitor the dispensing of water so that any malfunction in the system that could lead to flooding or water damage on the premises, or lack of watering of the plants is detected, and turns on an alarm indicator 58 via an alarm lead 59. The alarm indicator may be a bell and/or a flashing light or some other suitable alarm indicator that may serve to attract the attention of maintenance personnel.

The monitor and alarm unit 57 contains electronic logic control circuits that are connected to the stage two timers 25 via leads 25b and pressure sensors 61 (FIG. 1) via lead 61a. The monitor and alarm unit 57 receives information from the pressure sensors or any other suitable type water detection sensor 61 when water is being pumped into the system. Water should only be pumped when a stage two timer in ON. If water pressure is present without a stage two timer 25 being on, a fault condition is present and is alarmed. Conversely, if a stage two timer 25 is on without water pressure being sensed by sensor 61, it is also a fault indication that water is not being delivered.

Other fault conditions can be detected by further refinements. The pressure sensor 61 may have three sensitivity ranges: a low pressure sense range and a high pressure sense range and a normal pressure range therebetween. A low pressure range may indicate a leak in the system with water spilling on floors and carpets. A high pressure may indicate an obstruction in the system so that water is not being delivered to a part thereof and the normal pressure will indicate normal delivery at the required watering periods.

Still more refined monitoring may be performed by the monitor and alarm unit in that it may have its own timer built into it which can monitor, independently of the stage one 23 and stage two 25 timers, to insure that water is actually being delivered periodically and sensed by the pressure sensor 61. If that does not happen, as a result of a failure somewhere in the basic system module 21, or in an add-on system module 24, an alarm indication is generated.

FIG. 7 shows another embodiment of the watering system. In this embodiment stage one timers 32 and 39 are attached to identical system modules 33 that are each equipped with a rectifier 34 and a stage two timer 35 and a stage 3 power control 36, each connected with a water distribution network as shown in FIG. 1. In this system the second stage one 39 derives its primary timing from the first stage one timer 32, since it is operating only when the first stage one 32 is producing a timed output. Each system module 33 is connected to an external stage one timer 32 which may be an electromechanical type timer such as the Intermatic D811B or the like.

FIG. 8 shows a very simple embodiment of the invention that is suitable especially for small systems. It contains a rectifier 47 with an AC-connection 46 and a combined stage one and two timer 48 which may be constructed from a single 555 type circuit shown in FIG. 6 which provides both the interval timing t2 and watering period t1 (FIG. 6a).

In the various embodiments shown in FIG. 7 and 8, it follows that a monitor and alarm unit 57 with one or several pressure sensors 61 can be included as described above.

FIG. 9 shows one of the T-sections 41 shown in more detail. It has an inlet opening 42, leading via a spring loaded check valve 46 to a plenum 43, from which there are two or more branches: namely, branch 47 leading upward into tube 18, and branch 48 leading to the right into tube 19. A clip 45 serves to attach the T-section 41 to plants and draperies in order to enhance its support and concealment.

An automatic watering system as disclosed herein lends itself very well, due to its modular construction, to be configured as a multi-zone watering system which provides independent water distribution for several zones containing decorative plants and which may, for various reasons, have different watering needs.

Figure 10:
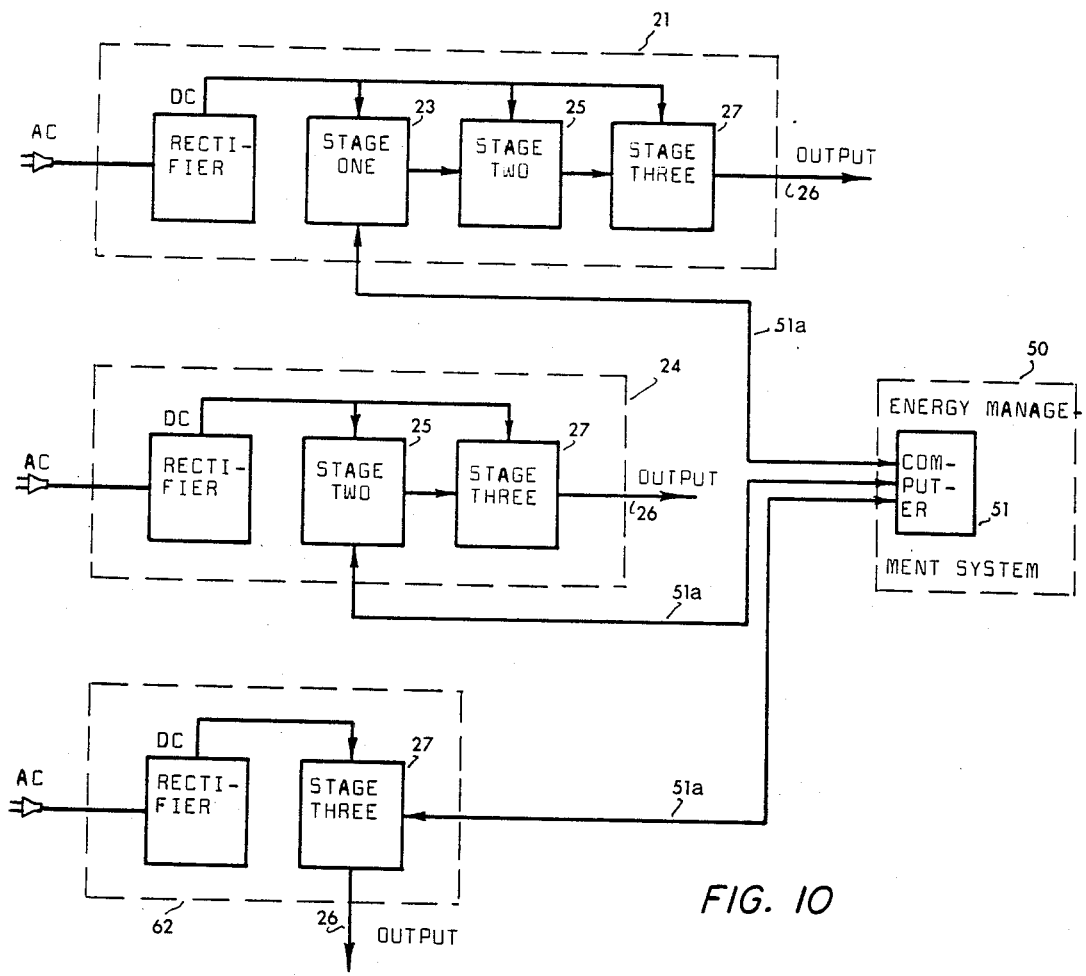
FIG. 10 is a block diagram of the invention combined with a building energy management system.

Further, a watering system as disclosed herein is well suited to be combined with a computerized appliance controller, security system or building energy management system, especially the embodiment of the invention described above, that uses the aforesaid National Semiconductor COP-type microprocessor timing chip as its principal timing element. Such a microprocessor control may be arranged to communicate via a standard data bus, such as RS232 or the like with the central control unit of the building energy management system, as shown in diagrammatic form in FIG. 10, wherein the timers 23 and 25 in system module 21 are connected via a data bus 51a with a computer 51 in the energy management system 50. The computer 51 may provide timing and/or modification of the timing pattern of the timing stages 23 and 25 for better overall energy and water efficiency. In like manner, computer 51 may be inter-connected via 51a with timer 25 as shown in system module 24 of FIG. 10, and used to provide the trigger timing for stage two timer 25, which might otherwise be available from stage one 23. Further, computer 51 may be interconnected via 51a with power control stage three 27 as shown in module 61 of FIG. 10, to provide the timing control which might otherwise be available from timing stages one 23 and two 25.

I claim:

1. A method of automatically watering individual decorative foliage located in an interior environment, the method substantially minimizing potential water damage to the interior environment, said method comprising the steps of:
   providing a water supply;
   providing a conduit from the water supply to the decorative foliage, said conduit having a branched network;
   individually controlling the flow of a portion of the water from the supply through the interior environment to each of the individual decorative foliage during recurring first predetermined time periods, separated by recurring second predetermined time periods, based on a flow control signal;
   generating the flow control signal having a time duration substantially equal to said first predetermined time period after every second predetermined time period; and
   said first predetermined time period having a time duration substantially less than said second predetermined time period, said first predetermined time period being less than one minute, thereby substantially minimizing any possible water damage to the environment should malfunction occur.

2. The method of claim 1 wherein said first predetermined time period is less than twenty seconds.

3. The method of claim 1 further comprising the step of adjusting the amount of water the decorative foliage receives based on the water requirements of the foliage.

4. The method of claim 1 further comprising the step of inhibiting the flow of water during said recurring second predetermined time periods.

5. The method of claim 1 further comprising the steps of:
   sensing the water pressure;
   monitoring the sensed pressure; and
   indicating a malfunction should the sensed pressure be above a predetermined level during said second predetermined time period.

6. The method of claim 1 further comprising the steps of:
   sensing the water pressure;
   monitoring the sensed water pressure; and
   indicating a malfunction should the sensed pressure be below a predetermined level during said first predetermined time period.

7. A method of automatically watering individual decorative foliage located in an interior environment, the method substantially minimizing potential water damage to the interior environment, said method comprising the steps of:
   counting a first predetermined time period on a recurring basis;
   transporting through a conduit a predetermined amount of water through the interior environment to the decorative foliage for a second predetermined time period after each recurring first predetermined time periods, said conduit having a branched network; and
   controlling the amount of water each of the individual decorative foliage receives during said second predetermined time period;
   said second predetermined time period being less than one minute, limiting the transportation of water through the interior environment to the decorative foliage, thereby minimizing potential water damage to the interior environment should malfunction occur.

8. The method of claim 7 wherein said second predetermined time period is less than twenty seconds.

9. The method of claim 7 further comprising the step of adjusting the amount of water the decorative foliage receives based on the water requirements of the foliage.

10. The method of claim 7 further comprising the step of inhibiting the flow of water during said recurring first predetermined time periods.

11. The method of claim 7 further comprising the steps of:
    sensing the water pressure transported;
    monitoring the sensed pressure; and
    indicating a system malfunction should the sensed pressure be above a predetermined level during said first predetermined time period.

12. The method of claim 7 further comprising the steps of:
    sensing the water pressure transported;
    monitoring the sensed water pressure; and
    indicating a system malfunction should the sensed pressure be below a predetermined level during said second predetermined time period.

* * * * *